July 8, 1958 W. D. WASSELL 2,842,418
CARRYING CASE AND CONTAINER
Filed March 15, 1951 2 Sheets-Sheet 1

INVENTOR
W. Dale Wassell
BY
Curtis, Morris + Safford
ATTORNEYS

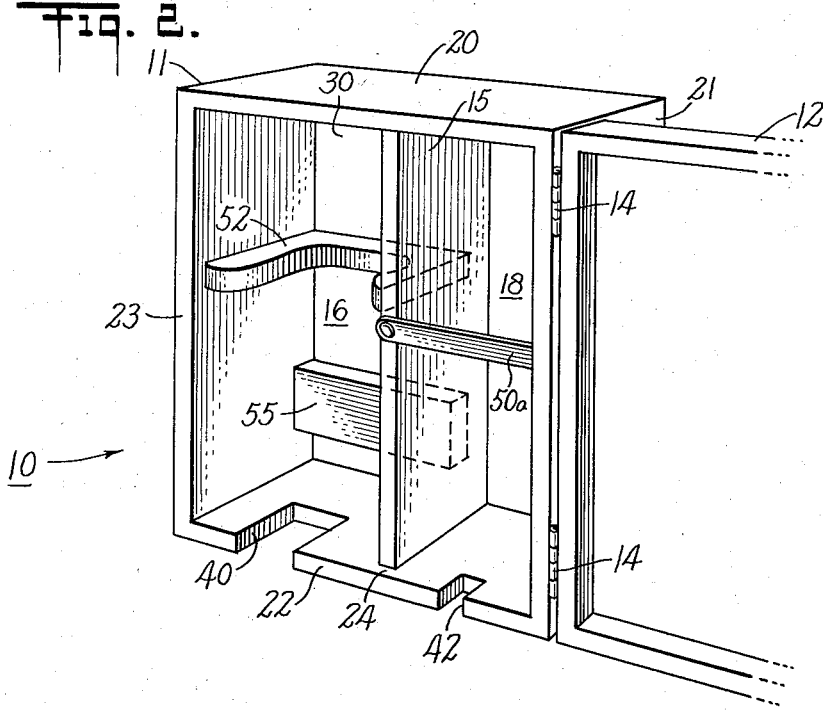
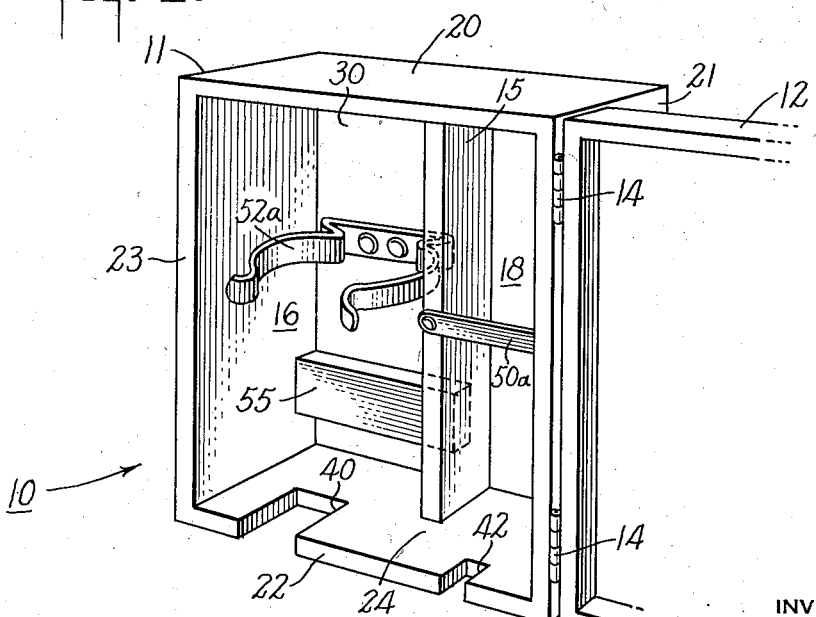

United States Patent Office 2,842,418
Patented July 8, 1958

2,842,418

CARRYING CASE AND CONTAINER

Willard D. Wassell, Westport, Conn.

Application March 15, 1951, Serial No. 215,759

5 Claims. (Cl. 312—209)

This invention relates to improved receptacles or holders for portable electric appliances, and more particularly to a holder for an electric shaver which may be used as a convenient storage means for the shaver when not in service and which may also be used as a portable carrying case.

It is an object of this invention to provide a receptacle or holder or container which is adapted to hold securely a portable electrical appliance such as an electric razor and which is also adapted to receive the electrical lead wiring associated with the appliance. Another object of the invention is to provide a receptacle which is adapted for removable attachment to a wall, cabinet or other vertical surface, thus serving as a storage receptacle when the appliance is not in use and also facilitating the immediate use of the appliance. A further object of the invention is to provide a receptacle for an electrical appliance which is suitable for use as a portable carrying case and which provides protection to the appliance against jars, shocks, shaking and other sources of injury to the appliance while being transported. Other objects of this invention will be in part obvious and in part pointed out hereinafter.

The features of the invention may be better understood and appreciated by reference to the accompanying drawings wherein:

Fig. 2 is a partial perspective view of another embodiment of this invention, showing in particular the interior arrangement thereof;

Fig. 3 is a partial perspective view of still another form of the invention.

Figure 1:
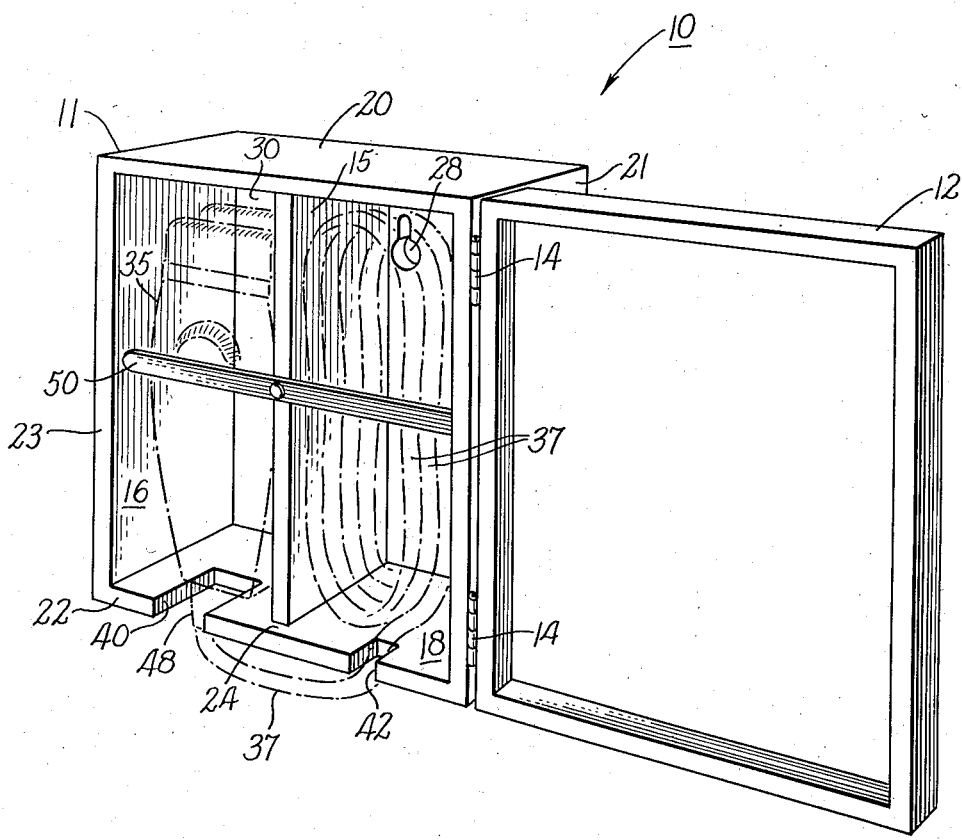
Fig. 1 is a perspective view of one embodiment of this invention, and shows in phantom view an electric razor and its wiring position within said embodiment.

The holder 10 comprises a container 11 and a cover member 12 which is connected thereto by means of the hinged connections 14. A latch (not shown) may be used to fasten cover 12 to the container 11. The container 11 has a bottom 30 and side-walls 20, 21, 22 and 23; it is divided internally by partition 15 into a shaver-holding section 16 and a lead-holding section 18; the partition 15 may extend from rear container wall 30 almost to the front of the container as shown in Figs. 1 and 2 or it may terminate somewhat below the front of the container thereby providing a wider passageway 24, as is shown in Fig. 3. An aperture 28 is provided in bottom 30 so that the entire holder 10 may be hung on a wall for storage of the shaver, or use thereof.

In Fig. 1, an electrical shaver 35 is shown in dotted outline as it would be positioned in the shaver-holding section 16. Conductor lead 37 is shown as attached to shaver 35 at one end and as terminating in the lead-holding section 18 at the other; in passing between these respective sections the conductor lead goes through lead apertures 40 and 42 in wall 22. These lead apertures are preferably arranged so that the edges of the wall 22 which engage the cover 12 are discontinuous. This permits easy removal of the lead from the relationship described and storage of the lead in section 18 when not in use, as in traveling. It is to be noted that aperture 40 is depicted as larger than aperture 42 in order to accommodate a soft or rigid terminal plug without bending thereof, while aperture 42 is of a size sufficient to permit the passage therethrough of the conductor lead.

Thus, when holder 10 is hung on a wall, it is convenient to have the lead attached to the end of the shaver and passing through aperture 40; the remainder of the lead is stored in section 18 and is passed through aperture 42, forming thereby a loop external to holder 10. This arrangement does not interfere with the engagement of closure 12 with the container 11. Also, when the entire holder 10 is used for traveling, one may simply disconnect the terminal 48 from shaver 35 and store the entire lead in section 18.

Various means may be employed for securely positioning the shaver 35 or other electrical appliances in section 16 of holder 10. Thus, in Fig. 1 is shown a retaining member 50 pivotally mounted on an edge portion of partition 15. In Fig. 2 is shown a resilient clip 52 mounted on and supported by partition 15 and walls 20 and 30; retaining member 50a is pivotably mounted on partition 15 in order to hold the lead within section 18. A leveling block 55 mounted on bottom 30 and between partition 15 and wall 23 serves to keep an appliance within section 16 in proper position. In Fig. 3 a resilient clip 52a is mounted solely on bottom 30 with leveling block 55 spaced a pre-determined distance therefrom.

The holder 10 and its appurtenant parts may be constructed of any suitable rigid or semi-rigid material such as wood, metal, plastic, and so on. Also, the holder may be partially or fully lined with soft material such as fabric, or rubber cushions or buttons may be used to protect the electrical appliance within the holder. Various arrangements to accomplish this purpose will be obvious to those skilled in the art.

While I have depicted and described various modifications of my invention, it is to be understood that various changes in the specific devices shown, and substitution of materials, may be made within the scope of this invention; thus the particular devices described are intended to illustrate and not limit the invention, whose boundaries are found in the appended claims.

I claim:

1. A combined storage and travel case for a small appliance, such as an electric razor, having a length of cord attached thereto and being completely removable from said case, said case comprising: a substantially rectangular box having a fixed back wall and side walls and a movable front wall to permit insertion and retention of the appliance; partition means dividing the interior of said box into a first appliance storage compartment and a second cord storage compartment, said first compartment being just slightly larger than the appliance, and said second compartment being just large enough to store the cord in a coiled condition, the bottom side wall common to said compartments having a first and a second three sided aperture therethrough, said first aperture being approximately centered beneath said first compartment so that the cord immediately adjacent the bottom end of the appliance can be passed through it, the size of said first aperture being large enough to permit insertion of the appliance end of the cord but small enough to prevent the appliance from slipping through it, said second aperture being approximately centered beneath said second compartment so that the cord can be passed therethrough, said second aperture being just large enough to permit insertion of one turn of the cord, said first and second apertures in conjunction with the wall portion between them serving as a support for a short length of cord immediate the bottom end of the appliance and passing on the outside of said case between said apertures, whereby when said appliance is inserted in said first compartment its bottom end is secured by this short length of cord which passes between said compartments on the outside of said case, and means in addition to said apertures, said partition means and said front wall for helping in retaining the appliance and the cord in their respective compartments.

2. The combination of elements as in claim 1 in which said means for retaining said appliance includes a rod pivoted at its center to said partition means.

3. The combination of elements as in claim 1 in which said means for retaining includes a rod pivoted at one end to said partition means and is adapted to swing over the top of said second compartment when the cord has been inserted therein in coiled condition whereby said cord can quickly and easily be stored while attached to the appliance.

4. The combination of elements as in claim 1 in which said first aperture is larger than said second aperture.

5. The combination of elements as in claim 1 in which said partition means is a thin partition wall.

References Cited in the file of this patent

UNITED STATES PATENTS

| | | |
|---|---|---|
| 890,194 | Strong | June 19, 1908 |
| 1,546,254 | Rotzell | July 14, 1925 |
| 1,590,692 | Lewis | June 29, 1926 |
| 1,801,148 | Gilson | Apr. 14, 1931 |
| 1,874,776 | Martin | Aug. 30, 1932 |
| 2,180,213 | Peake | Nov. 14, 1939 |
| 2,181,065 | Pfeifer et al. | Nov. 21, 1939 |
| 2,545,089 | Ladewig | Mar. 13, 1951 |

FOREIGN PATENTS

| | | |
|---|---|---|
| 89,886 | Sweden | Aug. 3, 1937 |
| 485,740 | France | Nov. 12, 1917 |